(12) United States Patent
Crews et al.

(10) Patent No.: US 7,681,892 B1
(45) Date of Patent: Mar. 23, 2010

(54) WHEELED MILITARY VEHICLE

(75) Inventors: Curtis T. Crews, Clifton, VA (US); William R. Crisp, Vass, NC (US)

(73) Assignee: American Growler, Robbins, NC (US)

( * ) Notice: Subject to any disclaimer, the term of this patent is extended or adjusted under 35 U.S.C. 154(b) by 743 days.

(21) Appl. No.: 11/520,851

(22) Filed: Sep. 13, 2006

(51) Int. Cl.
*B62D 39/00* (2006.01)
*B60P 3/06* (2006.01)

(52) U.S. Cl. .............. 280/33.997; 280/33.995; 280/33.996; 280/33.998

(58) Field of Classification Search ............ 280/33.991, 280/33.995, 33.996, 33.997, 33.998; 410/3, 410/4, 66, 67, 56, 57
See application file for complete search history.

(56) References Cited

U.S. PATENT DOCUMENTS

| 2,923,268 | A | * | 2/1960 | Fletcher et al. | 440/12.66 |
| 3,489,432 | A | * | 1/1970 | Karlstrom | 280/504 |
| 3,841,509 | A | * | 10/1974 | Chisum | 410/57 |
| 4,066,289 | A | * | 1/1978 | Gargour | 410/30 |
| 4,804,199 | A | * | 2/1989 | Picard | 280/33.998 |
| 6,726,438 | B2 | * | 4/2004 | Chernoff et al. | 414/802 |
| 6,974,148 | B2 | * | 12/2005 | Moss et al. | 280/511 |
| 7,029,022 | B2 | * | 4/2006 | Moss | 280/491.3 |
| 7,293,791 | B1 | * | 11/2007 | Williams, Jr. | 280/478.1 |
| 7,354,231 | B2 | * | 4/2008 | German | 410/32 |

* cited by examiner

*Primary Examiner*—Paul N Dickson
*Assistant Examiner*—John R Olszewski
(74) *Attorney, Agent, or Firm*—Lipton, Weinberger & Husick; Robert J. Yarbrough

(57) ABSTRACT

The Invention is a wheeled military vehicle that may be stacked one on top of another for efficient transportation aboard an aircraft such as a helicopter. A tubular frame reinforces the fenders of the military vehicle, allowing a first vehicle to support the weight of a second vehicle and to withstand the load applied by rigging. A pintle hook is connected to the military vehicle by a hinge and has a deployed and a folded position. The hinged pintle hook allows a combination of the military vehicle and a trailer to be shortened selectably so that the combination will occupy a reduced space within the fuselage of an aircraft.

15 Claims, 11 Drawing Sheets

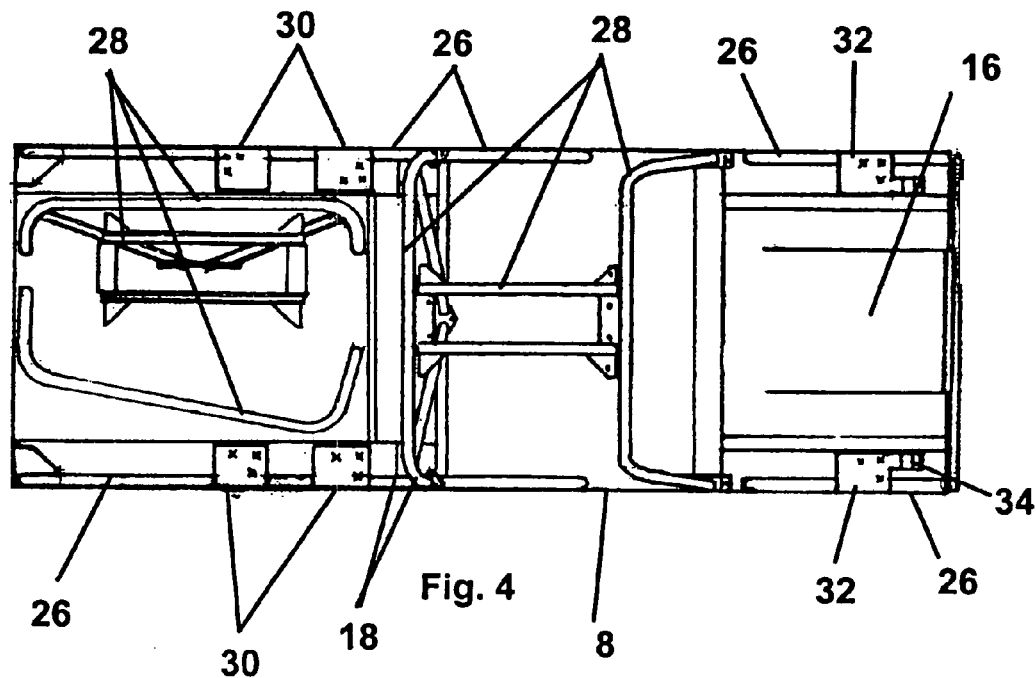
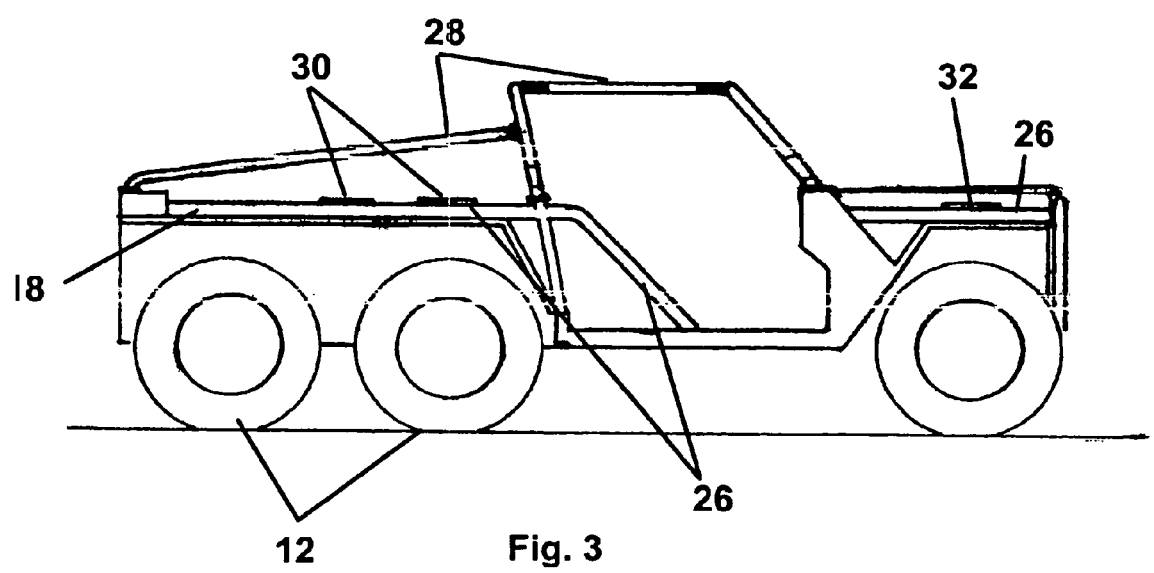

WHEELED MILITARY VEHICLE

I. BACKGROUND OF THE INVENTION

A. Field of the Invention

The Invention relates to a wheeled military vehicle that may be stacked for efficient transportation aboard an aircraft such as a helicopter. A combination of the military vehicle of the Invention and a trailer such as a towed weapon may be shortened so that the combination will occupy less space within the fuselage of an aircraft. Upon arrival by air at a destination, the military vehicle may be used to transport equipment, troops and supplies across difficult terrain.

B. Description of the Related Art

Wheeled vehicles for military and civilian transportation are well known in the art. Military vehicles also have been transported by air, as by fixed-wing aircraft or helicopter. The capabilities, weight limitations and internal dimensions of an aircraft may pose substantial constraints on a military vehicle to be transported by the aircraft. For example, the internal dimensions of the cargo area of the V-22 Osprey tilt-rotor aircraft are five feet wide by five feet high and less than seventeen feet long. The Osprey also presents limitations on floor loading. The V-22 Osprey will not accommodate conventional military vehicles within its cargo area.

Military vehicles may be suspended from helicopters using rigging techniques. Suspending a vehicle using rigging substantially degrades the performance of the aircraft compared with carrying a vehicle within the cargo area of the aircraft. None of the prior art teaches the military vehicle of the Invention.

II. BRIEF DESCRIPTION OF THE INVENTION

The Invention is a stackable, wheeled military vehicle configured to fit readily within a military aircraft, such as the V-22 Osprey tilt-rotor aircraft, without substantial modification to the vehicle. The vehicle of the Invention may be used in combination with a trailer, such as a towed weapon or ammunition trailer, which combination may be shortened while joined together to allow the combination of the vehicle and the trailer to fit into the V-22 Osprey. The military vehicle of the invention may be stacked and two of the stacked vehicles may be carried within the cargo area of the CH-47 Chinook helicopter.

The vehicle of the Invention is equipped with a hinged pintle hook for connecting to the tongue of a trailer. The pintle hook has two positions a deployed position and a folded position. When the pintle hook is in the deployed position, the vehicle is capable of towing a weapon or ammunition trailer connected to the pintle hook. When the combination of vehicle and trailer is loaded aboard an aircraft, the pintle hook may be pivoted about the hinge into a folded position. Folding the pintle hook shortens the combination of the vehicle and trailer, allowing the combination to fit physically into the aircraft.

The vehicle of the Invention includes a tubular frame. The tubular frame has a body portion and a removable roll cage portion. The body portion of the tubular frame is integral to the body of the vehicle. The roll cage portion, in combination with the body portion, is configured to assist in shielding the vehicle and its occupants in the event of an accident, such as a rollover accident. The roll cage portion and body portion of the tubular space also can assist in protecting the integrity of the vehicle during unloading operations.

The roll cage portion of the tubular frame is removable to reduce the height of the vehicle for stacking. The removable roll cage portion of the tubular frame is configured to be selectably attached to the body portion of the tubular frame at a plurality of points. A connection of the roll cage portion to the body portion at a point may comprise a tapered male connector welded to the tubing of the roll cage portion and a tapered female connector welded to and contained within the tubing of the body portion. When the tapered male connectors are mated with the tapered female connectors, the tubing defining the body portion and the tubing defining the roll cage portion are butted one to the other. The tapered nature of the male and female connectors holds the roll cage portion and the body portion in alignment. Bolts passing through bolting plates secure the male and female connectors in engagement.

The vehicle features fenders reinforced by the body portion of the tubular frame, which allows an upper vehicle to be stacked on top of a lower vehicle without damage. Tire plates mounted to the body portion of the tubular frame reinforce the fenders and provide a location on which to place the tires of an upper vehicle. The tire plates define stops to prevent the upper vehicle from rolling off of the lower vehicle during loading and unloading operations. The tire plates also prevent damage to the tires of the upper vehicle from deformation of the tires by force exerted by rigging and by the weight of the upper vehicle on the tubular frame of the lower vehicle.

Both four and six-wheeled embodiments of the vehicle of the Invention are presented. The removed roll cage portion of the frame may be stored for transportation either in the interior of the vehicle (in the six wheel embodiment) or on the hood of the vehicle (in the four wheel embodiment).

When an upper vehicle is stacked on a lower vehicle, rigging is used to bind the upper and lower vehicles together. Adequate force is placed on the upper and lower vehicles to collapse the suspension of the upper vehicle. Binding the vehicles together prevents shifting of the vehicles during transportation, such as transportation in the interior of a military aircraft.

The steering column of the lower vehicle is hinged and lowered to clear the floor pan of the upper vehicle when the upper vehicle is bound to the lower vehicle. The steering column is functional when in the lowered position. The lower vehicle in a stack may be driven under its own power by a driver sitting in the seat 10 of the lower vehicle 22; for example, to drive the stack of two vehicles into the cargo area of an aircraft.

III. BRIEF DESCRIPTION OF THE DRAWINGS

FIG. 3 is a side view of a six wheeled embodiment showing the roll cage portion installed.

FIG. 4 is a top view of the six wheeled embodiment.

IV. DESCRIPTION OF AN EMBODIMENT

The Invention is a wheeled motor vehicle for military applications. The wheeled motor vehicle is specifically designed to be used in conjunction with the V-22 Osprey aircraft as a component of the "Expeditionary Fire Support System" for the U.S. Marine Corps. As a component of that system, a pair of the vehicles of the Invention will be deployed. One vehicle of the Invention will tow a 120 mm mortar. The second vehicle will tow a trailer containing ammunition for the mortar. The mission of the pair of vehicles and the associated mortar and crew is to provide long-range indirect fire support to infantry forces. The Expeditionary Fire Support System is a part of the Marine Corps' "Ship to Objective Maneuver" doctrine. This doctrine advocates delivering forces directly to an objective while bypassing beach assaults.

Figure 1:
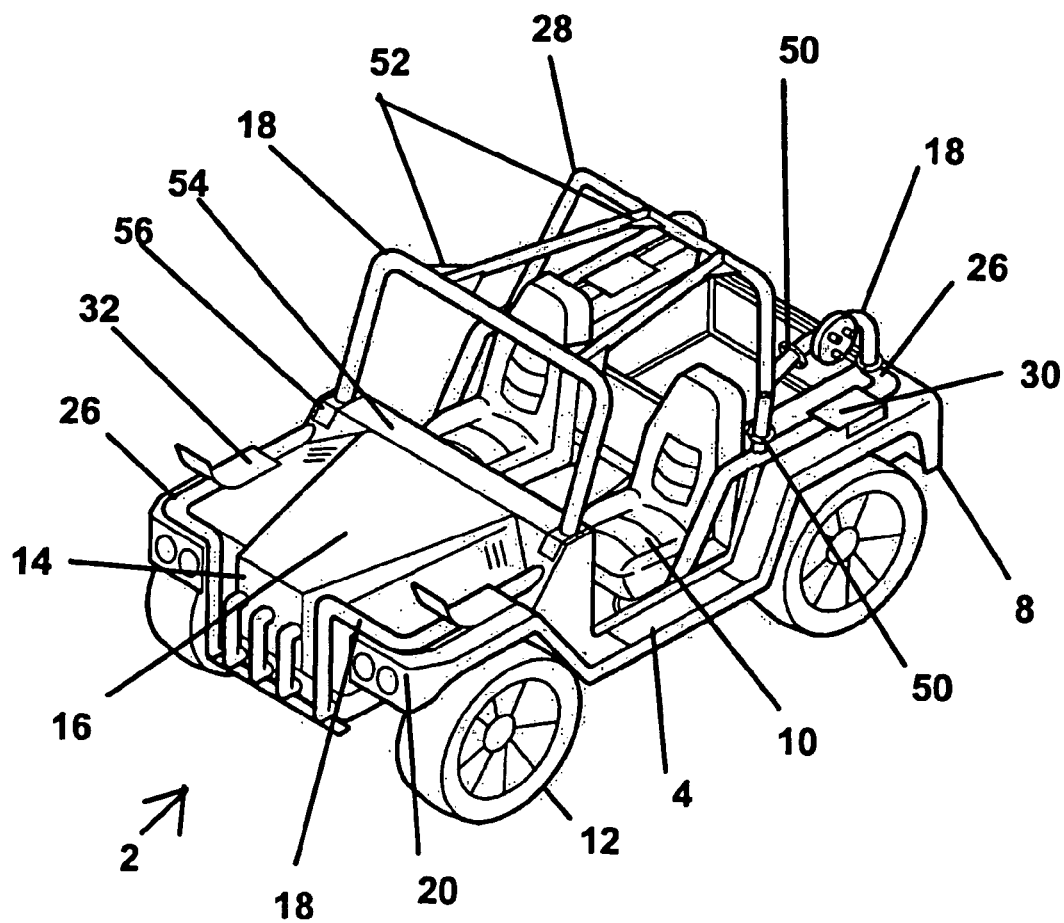
FIG. 1 is a perspective view of the four-wheeled embodiment of the stackable vehicle of the Invention.
Figure 2:
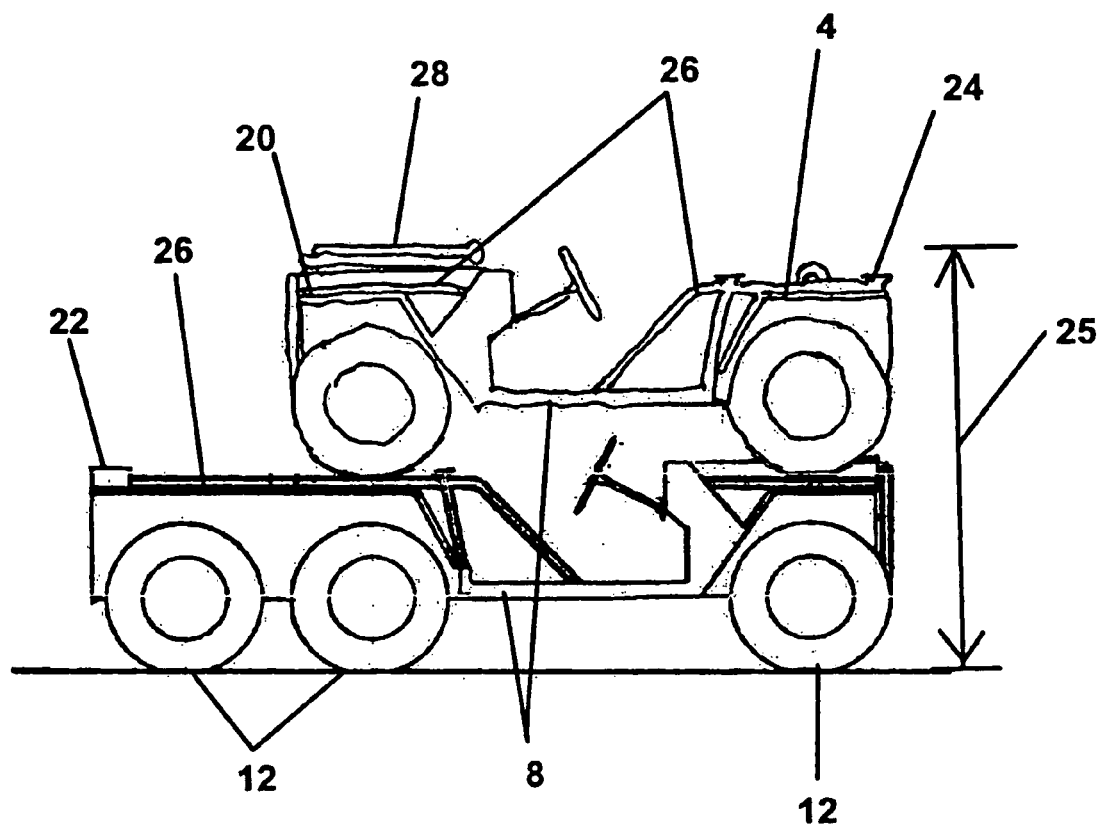
FIG. 2 is a side view of a four wheeled embodiment stacked on a six-wheeled embodiment of the Invention.
Figure 5:
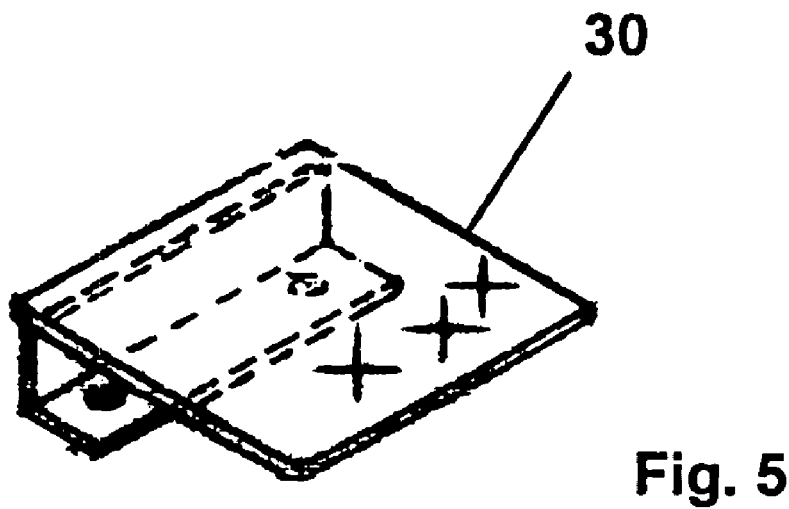
FIG. 5 is a first tire plate.

The military vehicle of the Invention is also designed to be used with the Boeing CH-47 Chinook helicopter. The stackable feature of the Invention allows the CH-47 helicopter to carry two stacked vehicles. FIG. 1 is a perspective view of a four-wheeled embodiment 4 of the military vehicle 2 of the Invention. FIG. 2 is a side view of a four-wheeled embodiment 4 stacked on top of a six-wheeled embodiment 6. From FIGS. 1 and 2, the military vehicle 2 includes a body 8. Body 8 supports seat 10. Seat 10 is configured to support an adult human occupant within the military vehicle 2. The military vehicle 2 is equipped with a plurality of ground-engaging wheels 12. An internal combustion engine 14 such as a turbo diesel engine is enclosed within hood 16.

A frame 18 is welded to body 8 and is integral with body 8. Body 8 defines fenders 20. Fender has top side 21. Frame 18 passes on the top side 21 of fenders 20 and reinforces fenders 20. Frame 18 and fender 20 are selected to be adequately strong so that the combination of frame 18 reinforced fenders 20 of a first vehicle 22 (shown on FIG. 2) will support a second vehicle 24.

In FIG. 2, second vehicle 24 is illustrated as a four-wheeled embodiment 4 and first vehicle 22 is shown as a six-wheeled embodiment 6. Other combinations are possible. A four-wheeled embodiment 4 may be stacked upon another four-wheeled embodiment 4 and a six-wheeled embodiment 6 may be stacked upon a six-wheeled embodiment 6. A six-wheeled embodiment 6 may not be stacked upon a four-wheeled embodiment 4. As shown by FIG. 2, the rear of the second vehicle 24 is oriented toward the front of the first vehicle 22 in a stack for improved weight distribution and to prevent local overloading of the floor of an aircraft.

The frame 18 comprises a body portion 26 and a roll cage portion 28. Body portion 26 and roll cage portion 28 may be composed of any suitable material and have any suitable configuration, but steel cylindrical tubing has proven suitable in practice. The tubing of the body portion is referred to herein as 'body portion tubing' and tubing of the roll cage portion is referred to herein as 'roll cage portion tubing.' The stacked combination of upper vehicle 24 and lower vehicle 22 has a stacked height 25. Stacked height 25 is kept to a minimum by providing for removal of roll cage portions 28 of both the upper and lower vehicles 24, 22. FIG. 1 shows the roll cage portion 28 attached to the body portion 26 of a four wheeled embodiment 4. FIG. 2 shows both the four wheeled embodiment 4 and the six wheeled embodiment 6 with the roll cage portion 28 removed for travel. FIG. 3 is a side view of the six wheeled embodiment with the roll cage portion 28 in place on the body portion 26 and together defining the frame 18 of the six wheeled embodiment 6.

When the roll cage portion 28 is not attached to body portion 26, as when the vehicle 2 is prepared for transit by helicopter, the roll cage portion is stored on or in the vehicle 2. FIG. 4 is a top view of the six wheeled embodiment 6 and shows a disassembled roll cage portion 28 stored in the cargo area. FIG. 4 also shows the roll cage portion 28 mounted to the body portion 26 of the frame 18. FIG. 2 shows the removed roll cage portion of a four-wheeled embodiment stored for travel in a stored position on the hood of the four-wheeled embodiment.

As shown by FIGS. 1, 3, 4, 5 and 6, load plates 30, 32 are attached to the body portion 26 of the frame 18 reinforcing fenders 20. Load plates 30, 32 are located so that the tires of a second vehicle 2 will align with the load plates 30 when the vehicles 2 are stacked. The load plates 30 of a lower vehicle 2 support the tires of the upper vehicle 24. The load plates 30 prevent excessive deformation and hence damage to the tires of upper vehicle 24 when the vehicles 2 are stacked and the upper vehicle 24 is rigged to the lower vehicle 22.

Figure 6:
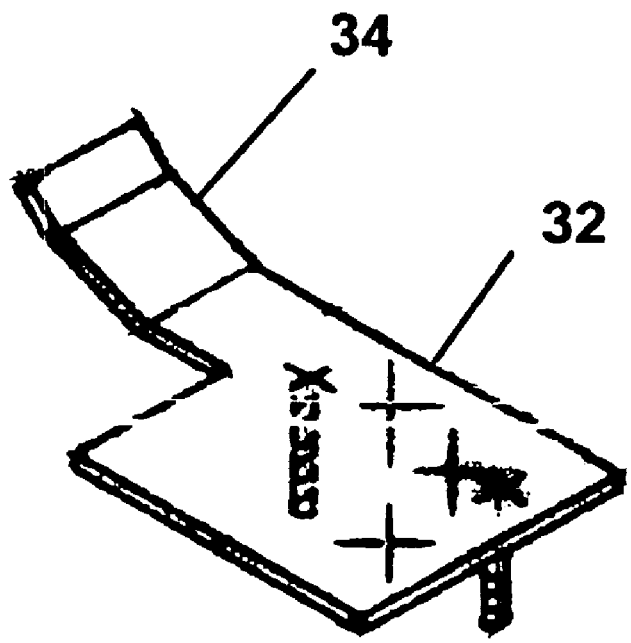
FIG. 6 is a second tire plate.

Load plate 32 shown by FIG. 6 features a raised wheel-controlling member 34. Wheel controlling member 34 prevents the wheels of an upper vehicle 24 from rolling off of the load plate 32 in a forward direction when the upper vehicle 24 is being loaded or unloaded from a lower vehicle 22.

Figure 7:
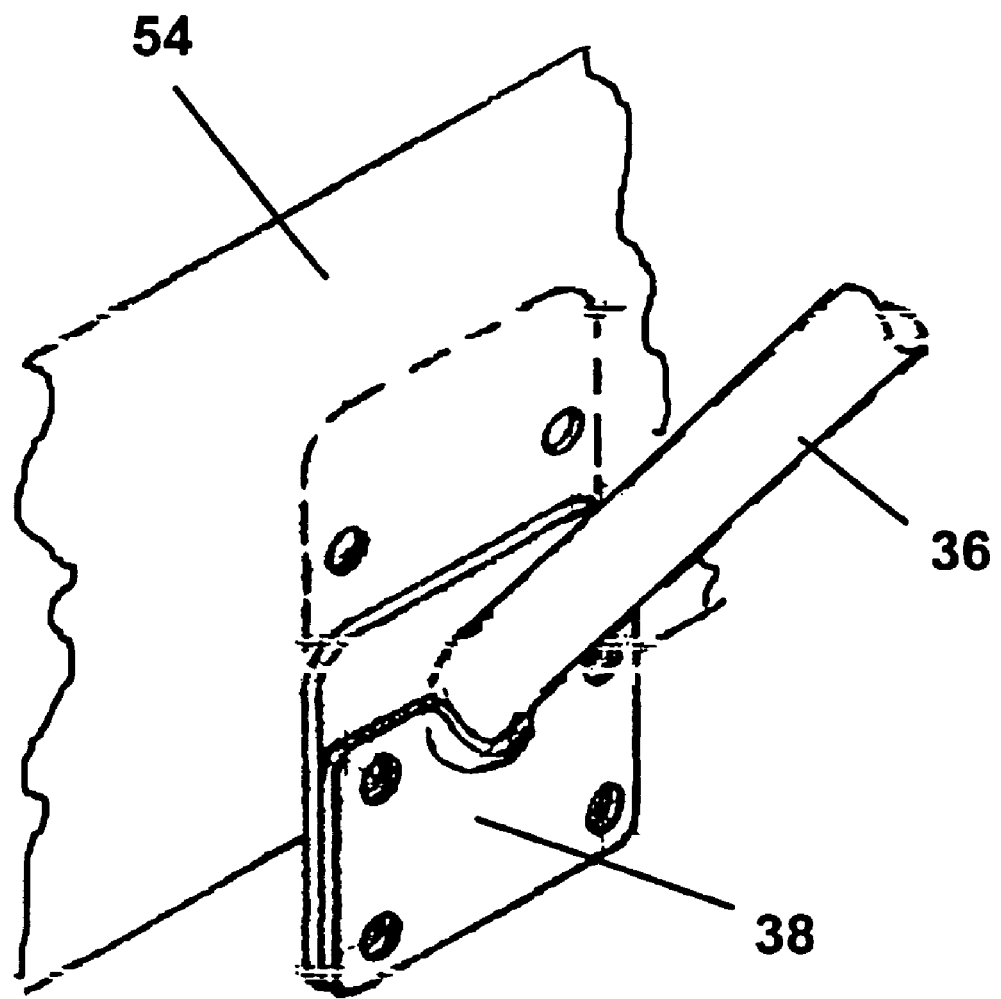
FIG. 7 is a detail of a dashboard bracket.

When an upper vehicle 24 is stacked upon and rigged to a lower vehicle 22, adequate force is applied by the rigging to collapse the suspension of the upper vehicle 24 to prevent movement of the upper vehicle 24 during transportation. The collapse of the suspension of the upper vehicle 24 causes the floor pan of the upper vehicle 24 to interfere with the steering wheel of the lower vehicle 22. As shown by FIG. 7, interference by the floor pan of the upper vehicle 24 and the steering wheel of the lower vehicle 22 is avoided by hinging the steering column 36 of the lower vehicle 22 and providing a steering column bracket 38 having two positions. When the bracket 38 is in the upper position, the steering column 36 is raised to a comfortable driving position. When the bracket 38 is in the lower position, the steering column 36 is lowered and will not interfere with an upper vehicle 24 when the vehicles 2 are stacked. When in the lowered position, the steering column 36 is functional and the lower vehicle 22 may be driven under its own power; for example, the lower vehicle 22 may be driven to load the stacked combination of a lower and an upper vehicle 22, 24 into the cargo area of an aircraft. Lowering of steering column 36 allows stack height 25 to be kept to a minimum.

As noted above, the vehicle 2 of the invention may be transported in the cargo area of a helicopter or tilt-rotor aircraft with the roll cage portion 28 disassembled from the body portion 26. Upon arrival at a destination, the roll cage portion 28 can be installed on body portion 26. FIGS. 8, 9, 10, 11, 12 and 13 illustrate the features of the vehicle 2 allowing the roll cage portion 28 of frame 18 to be installed in the field while achieving high strength connections of the roll cage portion tubing and of the body portion tubing.

Figure 8:
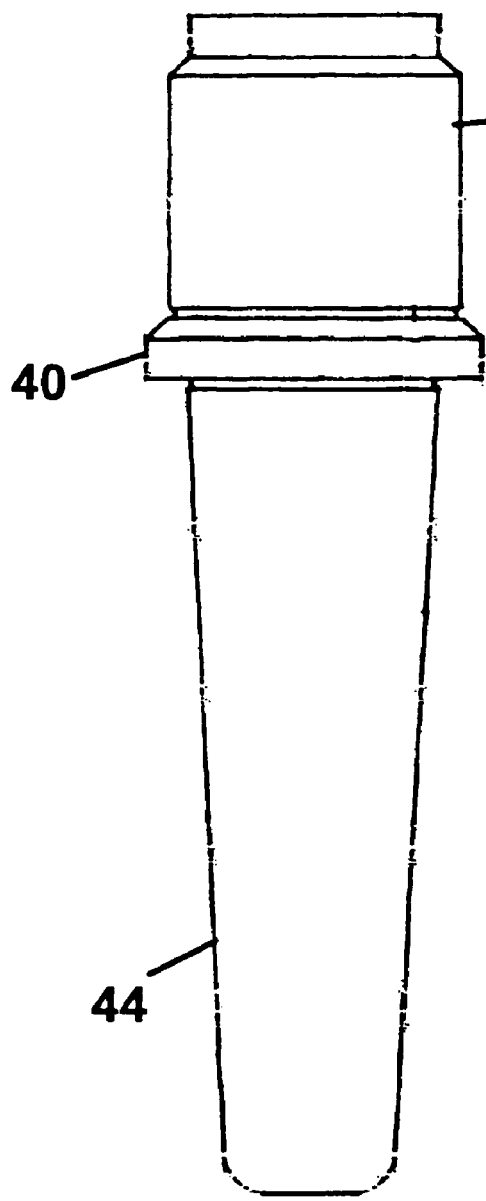
FIG. 8 is a male connector.
Figure 9:
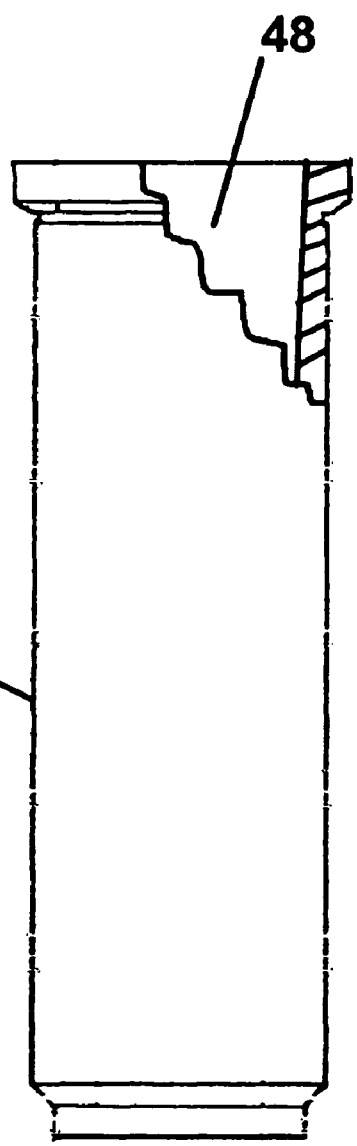
FIG. 9 is a partial cutaway view of the female connector.

FIG. 8 illustrates a male connector 40 having a shank 42 and a tapered portion 44. Shank 42 of male connector 40 is configured to be inserted into a tube of the roll cage portion 28 or the body portion 26 of frame 18. The shank 42 is welded in place, permanently attaching the male connector 40 to the roll cage portion tubing or the body portion tubing. FIG. 9 is a partial cutaway drawing illustrating a female connector 46 having a tapered opening 48. Tapered opening 48 is configured to receive tapered portion 44 of male connector 40. Female connector 46 is configured to be inserted during manufacture of vehicle 2 into tubing of the body portion 26 or the roll cage portion 28 of frame 18 and welded into place. During assembly of the roll cage portion 28 to body portion 26, a user will insert the male connector tapered portion 44 into the female connector tapered opening 48, joining the body portion tubing to the roll cage portion tubing.

Figure 10:
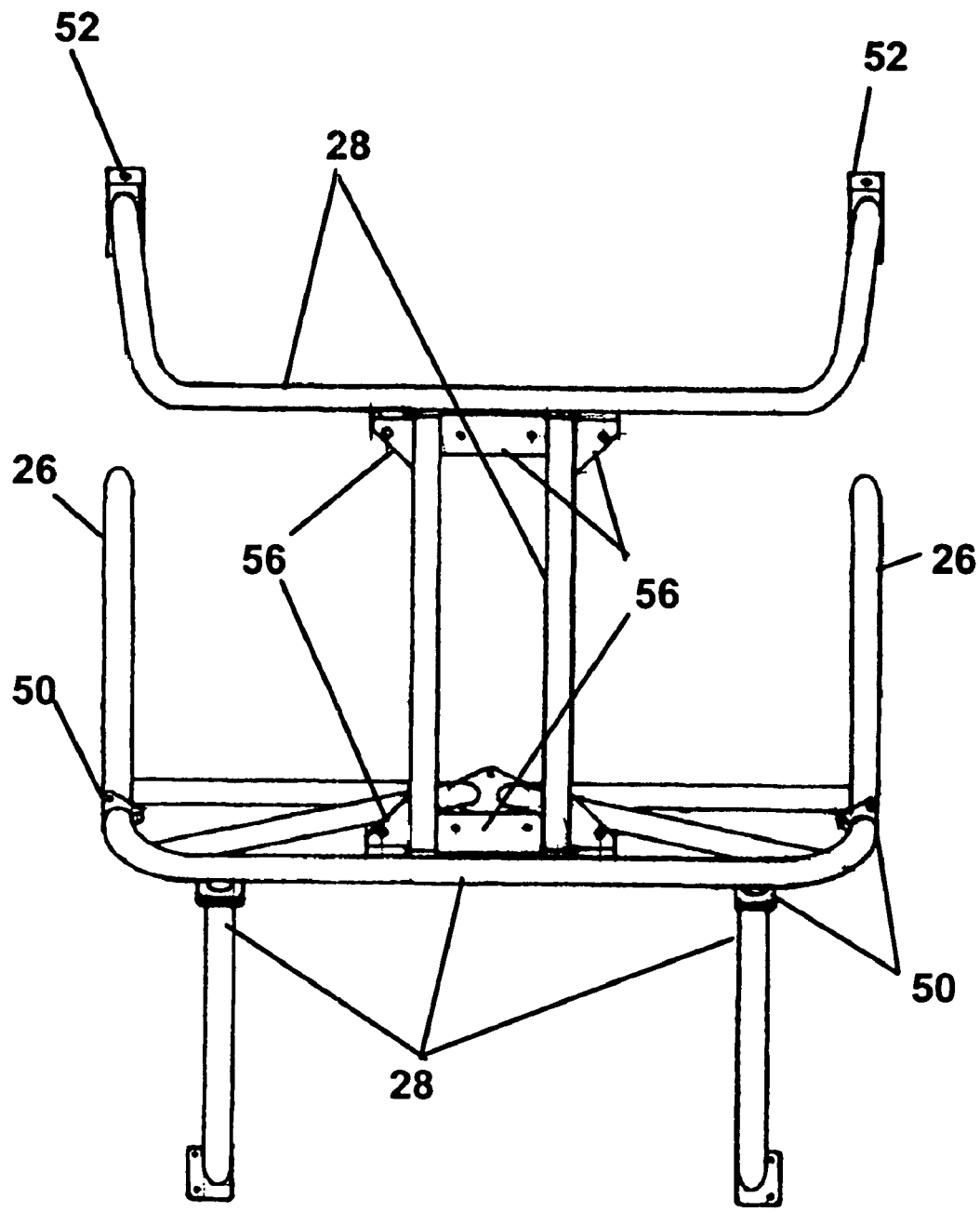
FIG. 10 is the roll cage portion of a four-wheeled embodiment including a part of the body portion.

The male and female connectors 40, 46 are held in engagement by bolting plates 50, illustrated by FIGS. 10, 11, 12 and 13. FIG. 10 is a top view of a roll cage portion 28 and a partial view of the body portion 26. FIG. 10 shows four butt joints of tubing of roll cage portion 28 and body portion 26. Each of the butt joints is indicated by a pair of bolting plates 50 used to hold the male and female connectors 40, 46 in engagement.

Figure 12:
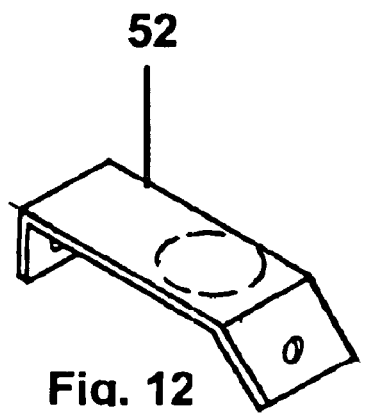
FIG. 12 is a second bolting bracket.
Figure 11:
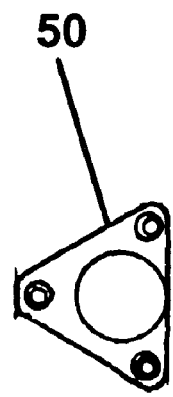
FIG. 11 is a first bolting bracket.
Figure 13:
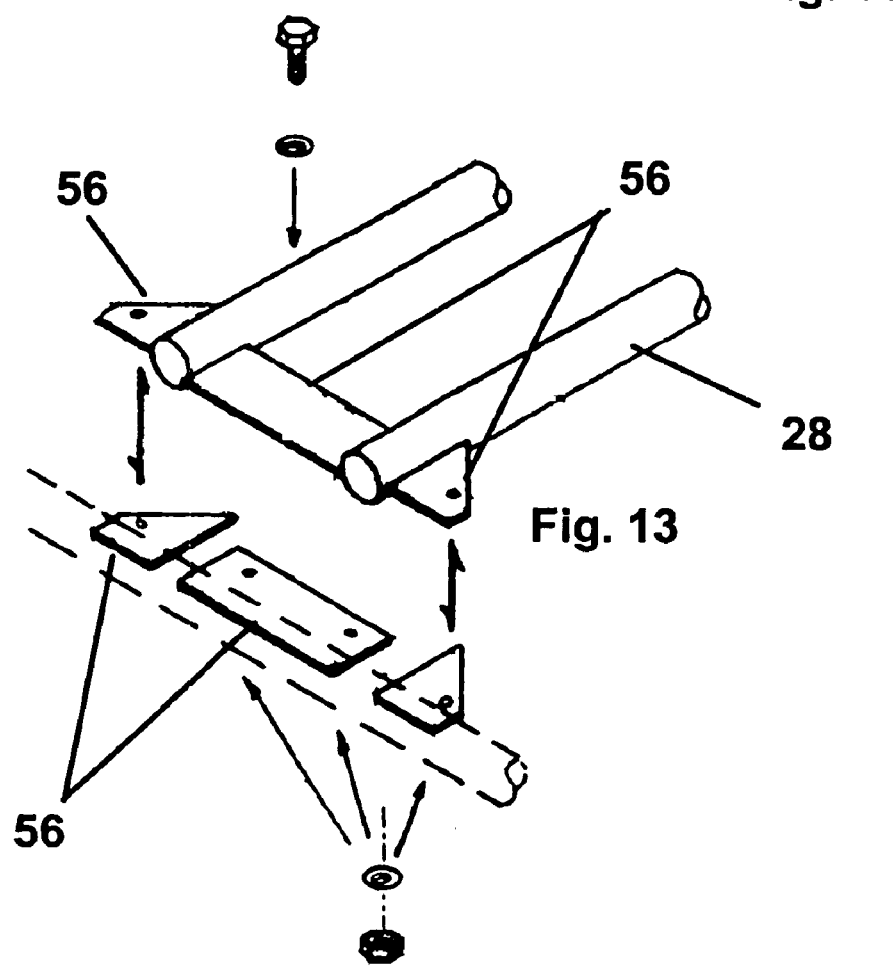
FIG. 13 is a detail of the roll cage portion.

As illustrated by FIG. 10 and by the detail of FIG. 12, a body bracket 52 is used to bolt roll cage portion 28 to the dashboard 54 of vehicle 2. Bolting tabs 56, shown by FIGS. 10 and 13, are used to connect roll cage portion 28 tubing where a butt connection is not feasible. Bolting tabs 56 are welded to each of the tubes to be joined and bolted one to the other.

Figure 14:
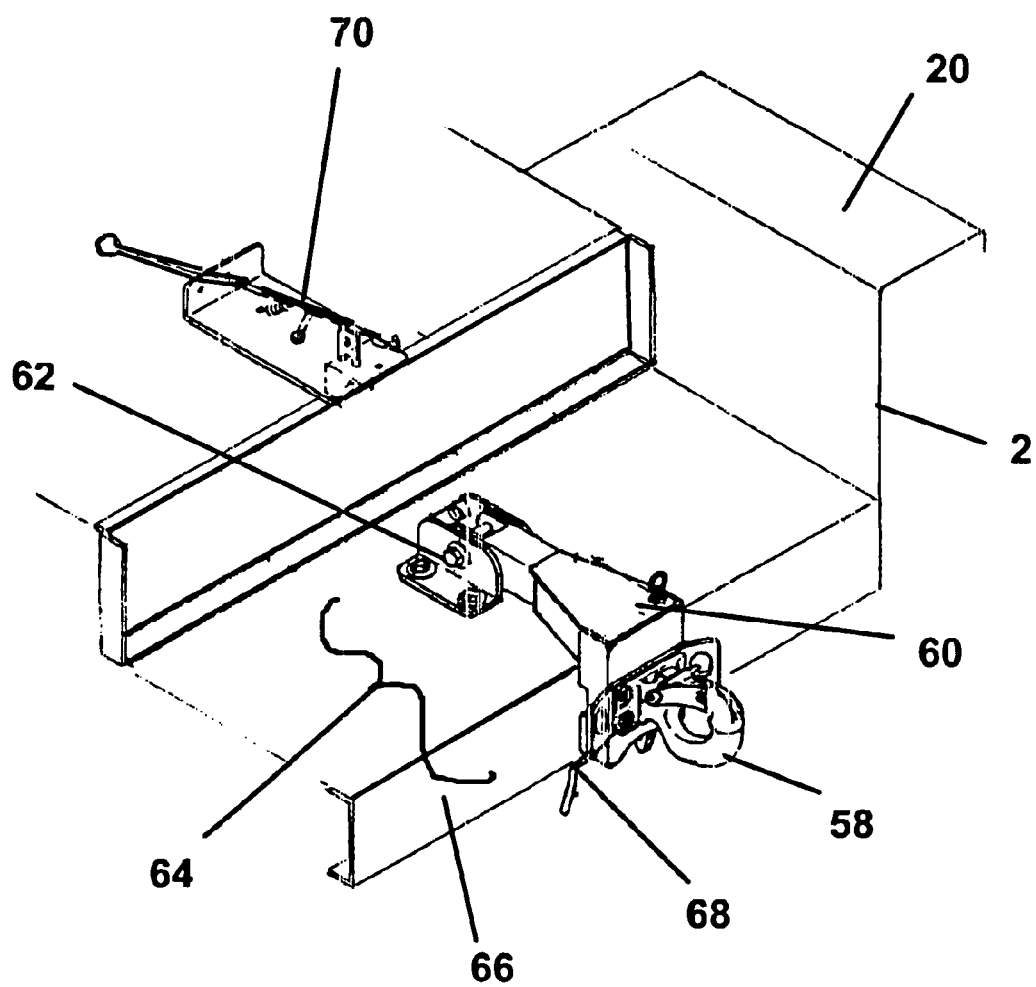
FIG. 14 is a detail showing the hinged pintle hook in the deployed position.
Figure 15:
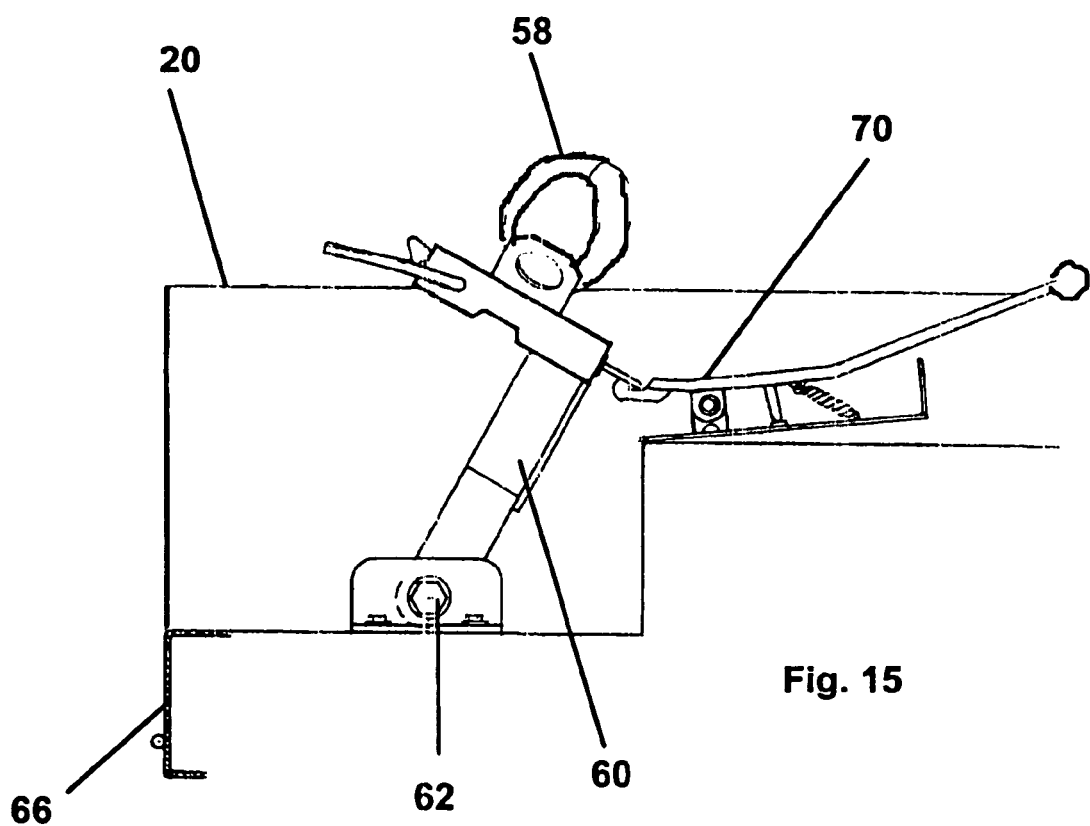
FIG. 15 is a detail showing the hinged pintle hook in the folded position.
Figure 16:
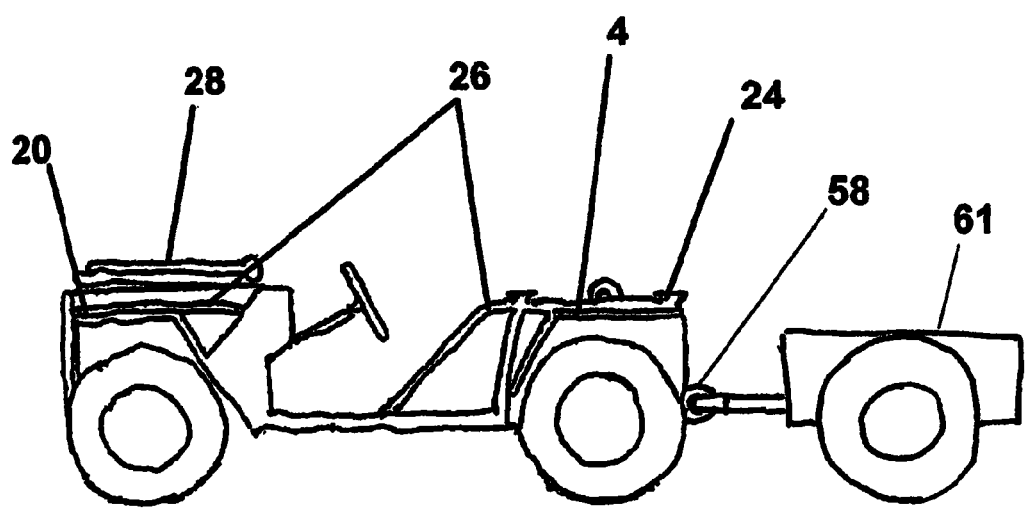
FIG. 16 is a side view of the four-wheeled embodiment with an attached trailer.

FIGS. 14, 15 and 16 illustrate operation of the folding pintle hook 58 of the Invention. Pintle hook 58 is adapted to engage a tow ring of a trailer 61 and hence allows the vehicle 2 to tow a weapon or a munitions trailer 61. Pintle hook 58 in combination with shaft 60 and hinge 62 forms a pintle hook assembly 64. Pintle hook assembly 64 has a deployed position, illustrated by the perspective view of FIG. 14 and the side view of FIG. 16, and a folded position, illustrated in side view by FIG. 15. In the deployed position, shown by FIG. 14, pintle hook assembly 64 is rotated until shaft 60 engages rear bumper 66 of vehicle 2. Deployed position latch 68 releasably holds the pintle hook assembly 64 in the deployed position.

Whenever vehicle 2 tows a trailer 61, pintle hook assembly 64 is in the deployed position. Vehicle 2 cannot tow a trailer 61 with the pintle hook assembly 64 in the stored position because the front of the trailer 61 would interfere with the rear of the vehicle 2 when making a turn. When a combination of a vehicle 2 and a trailer 61 is to be transported by aircraft, the combination of vehicle 2 and trailer 61 is driven into the cargo area of the aircraft, such as the V-22 Osprey. Deployed position latch 68 is released and pintle hook assembly 64 is rotated about hinge 62 to the folded position, shown by FIG. 15. Pintle hook assembly 64 is retained in the folded position by folded position latch 70. Moving pintle hook assembly 64 from the deployed position to the folded position moves pintle hook 58, and hence the attached trailer 61, toward the front of the vehicle 2, shortening the combination of vehicle 2 and trailer 61 and allowing the combination to fit within the aircraft.

When the aircraft reaches its destination, the folded position latch 70 is released, the pintle hook assembly 64 is returned to the deployed position and the combination of vehicle 2 and trailer 61 is driven from the aircraft.

To load a stack of two vehicles 2 into an aircraft such as a C-47 Chinook helicopter, bolts are removed from bolting plates 50, 52 and from bolting tabS 56. Male and female connectors 40, 46 are disengaged and the roll cage portion 28 is removed from both upper vehicle 24 and lower vehicle 22. The roll cage portion 28 is stored on the hood 16 for a four-wheeled embodiment 4 or in the cargo area for a six-wheeled embodiment 6. Steering column 36 is moved from the upper position to the lower position by moving steering column bracket 38. Upper vehicle 24 is lifted by a forklift or crane and placed on lower vehicle 22 such that the wheels 12 of upper vehicle rest on wheel plates 30, 32. Upper vehicle 24 is rigged to lower vehicle 22 and adequate force applied by the rigging to collapse the suspension of the upper vehicle. A driver then starts the engine 14 of lower vehicle 22 and drives lower vehicle 22, with upper vehicle 24 stacked on top, into the cargo area of an aircraft, where lower vehicle is secured to the aircraft. Unloading of the aircraft is the reverse of this process.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

We claim:

1. A stackable military vehicle, the vehicle comprising:
   a. a body;
   b. a seat connected to said body, said seat and said body being configured to accommodate an adult human occupant;
   c. a plurality of ground-engaging wheels rotatably connected to said body, said wheels being adapted to support said body;
   d. an internal combustion engine attached to said body, said internal combustion engine being adapted to selectably rotate a one of said plurality of said wheels, the military vehicle being a first vehicle of a pair of the military vehicles, said body being configured so that a second vehicle of said pair of the military vehicles may be stacked upon said first vehicle for transport, said first vehicle being configured such that said first vehicle may be driven when said second vehicle is stacked upon said first vehicle;
   e. a frame defining a body portion, said body portion being configured to support said second vehicle when said second vehicle is stacked upon said first vehicle,
   f. said frame defining a roll cage portion, said roll cage portion being configured to be removably attached to said body portion, said roll cage portion extending above said body when said roll cage is attached to said body portion whereby said roll cage portion and said body portion in combination provide a degree of protection to the vehicle and to said occupant of the vehicle in the event of a rollover of the vehicle;
   g. said roll cage portion defining a one of a male and a female connector, said body portion defining the other of said male and said female connector, said female connector defining a tapered opening, said male connector selectably and matably engaging said tapered opening of said female connector when said roll cage portion is removably attached to said body portion.

2. The stackable vehicle of claim 1, further comprising: a steering column having a steering wheel, said steering column being hingedly connected to said body, said steering column having a lower position and an upper position, said lower position and said upper position being selectable, said steering column and said body being configured such that said steering wheel of said first vehicle does not interfere with said second vehicle when said second vehicle is stacked upon and rigged to said first vehicle and said steering column is in said lower position, said steering column and said body being configured such that said first vehicle may be driven when said steering column is in said lower position, said steering column and said body being configured such that said steering wheel will interfere with said second vehicle when said steering column is in said upper position and said second vehicle is stacked on said first vehicle and rigged to said first vehicle.

3. The stackable vehicle of claim 2 wherein said first and said second vehicles in combination have a stacked height when said roll cage portions of said first and said second vehicles are removed, said steering column of said first vehicle is in said lower position, said second vehicle is stacked on said first vehicle and said second vehicle is rigged to said first vehicle, said stacked height being selected to fit within an aircraft.

4. The stackable vehicle of claim 3 wherein said plurality of ground-engaging wheels consists of four ground-engaging wheels, said body defines a hood, said roll cage portion and said hood are configured so that said roll cage portion may be placed in a stored position on said hood when said roll cage is removed from said body, said hood and said roll cage portion being configured such that said roll cage portion does not increase substantially said stacked height when said roll cage portion is in said stored position.

5. The stackable vehicle of claim 3 wherein said plurality of said ground-engaging wheels consists of six ground-engaging wheels, said body defining a cargo bed, said roll cage portion and said cargo bed being configured so that said roll cage portion has a stored position within said cargo bed when said roll cage portion is removed from said body portion, said roll cage portion not increasing substantially said stacked height when said roll cage portion is in said stored position.

6. A stackable military vehicle, the vehicle comprising:
   a. a body;
   b. a seat connected to said body, said seat and said body being configured to accommodate an adult human occupant;
   c. a plurality of ground-engaging wheels rotatably connected to said body, said wheels being adapted to support said body;
   d. an internal combustion engine attached to said body, said internal combustion engine being adapted to selectably rotate a one of said plurality of said wheels, the military vehicle being a first vehicle of a pair of the military vehicles, said body being configured so that a second vehicle of said pair of the military vehicles may be stacked upon said first vehicle for transport, said first vehicle being configured such that said first vehicle may be driven when said second vehicle is stacked upon said first vehicle, wherein said configuration of said body so that said second vehicle may be stacked upon said first vehicle comprising: a frame having a body portion, said body portion being integral to said body, said body portion being adapted to support said second vehicle when said second vehicle is stacked upon said first vehicle; wherein said configuration of said body so that said second vehicle may be stacked upon said first vehicle further comprising: said frame having a roll cage portion, said roll cage portion being configured to be removably attached to said body portion, said roll cage portion extending above said body when said roll cage is attached to said body portion whereby said roll cage portion and said body portion in combination provide a degree of protection to the vehicle and to said occupant of the vehicle in the event of a rollover of the vehicle, wherein said configuration of said body so that said second vehicle may be stacked upon said first vehicle further comprising: a fender having a top side, said fender being defined by said body, said body portion comprising a body portion tubing located on said top side of said fender and reinforcing said fender, said body portion tubing and said fender of said first vehicle in combination being configured to support a one of said plurality of wheels of said second vehicle when said second vehicle is stacked upon said first vehicle.

7. The stackable military vehicle of claim 6 wherein said configuration of said body so that said second vehicle may be stacked upon said first vehicle further comprising: a load plate attached to said body portion tubing located on said top side of said fender, said load plate being located to receive said one of said plurality of wheels of said second vehicles when said second vehicles is stacked upon said first vehicle, said load plate defining a one of a plurality of wheel rolling barriers, said plurality of said wheel rolling barriers retarding rolling of said plurality of wheels of said second vehicle when said second vehicle is stacked upon said first vehicle.

8. A stackable military vehicle, the vehicle comprising:
   a. a body;
   b. a seat connected to said body, said seat and said body being configured to accommodate an adult human occupant;
   c. a plurality of ground-engaging wheels rotatably connected to said body, said wheels being adapted to support said body;
   d. an internal combustion engine attached to said body, said internal combustion engine being adapted to selectably rotate a one of said plurality of said wheels, the military vehicle being a first vehicle of a pair of the military vehicles, said body being configured so that a second vehicle of said pair of the military vehicles may be stacked upon said first vehicle for transport, said first vehicle being configured such that said first vehicle may be driven when said second vehicle is stacked upon said first vehicle;
   e. a pintle hook;
   f. a shaft connected to said pintle hook;
   g. a hinge connecting said body and said shaft, said hinge, said shaft and said pintle hook in combination defining a pintle hook assembly, said pintle hook being configured to connect to a tongue of a trailer, said trailer and said first vehicle defining a vehicle/trailer combination, said pintle hook assembly being selectably rotatable about said hinge between a deployed position and a folded position when connected to said tongue of said trailer, said vehicle/trailer combination having a first length when said pintle hook is in said deployed position, said vehicle/trailer combination having a second length when said pintle hook is in said folded position, said second length being less than said first length.

9. The stackable vehicle of claim 8, said pintle hook assembly further comprising:
   a. deployed position latch configured to selectably retain said pintle hook in said deployed position;
   b. a folded position latch configured to selectably retain said pintle hook in said folded position.

10. A stackable vehicle, the vehicle comprising:
   a. a body;
   b. a seat connected to said body, said seat and said body being configured to accommodate an adult human occupant;
   c. a plurality of ground-engaging wheels rotatably connected to said body, said wheels being adapted to support said body;
   d. an internal combustion engine attached to said body, said internal combustion engine being adapted to rotate a one of said plurality of said wheels;
   e. a plurality of fenders defined by said body, each of said plurality of fenders being configured to intercept a debris ejected by a one of said plurality of said wheels when said one of said plurality of said wheels is rotating, the vehicle being a first vehicle of a pair of vehicles, said plurality of said fenders being adapted to support a second vehicle of said pair of vehicles when said second vehicle is stacked upon said first vehicle, wherein said adaptation of said plurality of fenders to support said second vehicles comprises; each of said plurality of fenders being configured to receive and to support a one of said plurality of wheels of said second vehicle;

f. a roll cage portion, said roll cage portion being removably attached to said body, said roll cage extending above said body when said roll cage is attached to said body, said roll cage portion defining a one of a male and a female connector, said body defining the other of said male and said female connector, said female connector defining a tapered opening, said male connector defining a tapered shank, said tapered shank selectably and matably engaging said tapered opening of said female connector when said roll cage portion is removably attached to said body.

11. The stackable vehicle of claim 10, further comprising: a steering column having a steering wheel, said steering column being hingedly connected to said body, said steering column having a lower position and an upper position, said steering wheel being above a level of said body when said steering column is in said upper position, said steering wheel not interfering with said body of said second vehicle when said second vehicle is stacked upon and rigged to said first vehicle and said steering column is in said lower position, said steering wheel being operable to steer said first vehicle when said steering column is in said lower position and said second vehicle is stacked upon and rigged to said first vehicle, said steering column and said body being configured such that said steering wheel will interfere with said second vehicle when said steering column is in said upper position and said second vehicle is stacked upon and rigged to said first vehicle.

12. The stackable vehicle of claim 11 wherein said first vehicle and said second vehicle in combination have a stacked height when said roll cage portions of said first and said second vehicles are removed and said steering column of said first vehicle is in said lower position, said stacked height being selected to fit within a cargo area of an aircraft.

13. The stackable vehicle of claim 12 wherein said plurality of ground-engaging wheels consists of four ground-engaging wheels, said body defines a hood, said roll cage portion and said hood are configured so that said roll cage portion has a stored position on said hood when said roll cage portion is removed from said body, said roll cage portion not increasing substantially said stacked height when said roll cage is in said stored position.

14. The stackable vehicle of claim 12 wherein said plurality of said ground-engaging wheels consists of six ground-engaging wheels, said body defining a cargo bed, said roll cage portion and said cargo bed are configured so that said roll cage portion has a stored position within said cargo bed when said roll cage portion is removed from said body, said roll cage portion not increasing substantially said stacked height when said roll cage portion is in said stored position.

15. A stackable vehicle, the stackable vehicle comprising:
a. a body;
b. a seat connected to said body, said seat and said body being configured to accommodate an adult human occupant;
c. a plurality of ground-engaging wheels rotatably connected to said body, said wheels being adapted to support said body;
d. an internal combustion engine attached to said body, said internal combustion engine being adapted to selectably rotate said plurality of said wheels;
e. a frame attached to said body, the vehicle being a first vehicle of a pair of vehicles, said frame being adapted to support a second vehicle of said pair of vehicles when said second vehicle is stacked upon said first vehicle;
f. a pintle hook hinge connected to said body;
g. a pintle hook shaft, said pintle hook shaft being connected to said hinge,
h. a pintle hook connected to said pintle hook shaft, said pintle hook being configured to connect to a tongue of a trailer, said pintle hook being selectably rotatable about said pintle hook hinge between a deployed position and a folded position when connected to said tongue of said trailer, said first vehicle and said trailer defining a vehicle/trailer combination, said vehicle/trailer combination having a first length when said pintle hook is in said deployed position, said vehicle/trailer combination having a second length when said pintle hook is in said folded position, said second length being less than said first length
i. a deployed position latch operably connected to said pintle hook, said pintle hook latch selectably retaining said pintle hook in said deployed position.

* * * * *